June 23, 1970     H. M. VALENTINE     3,516,430
AUTOMATIC DRAIN VALVE
Filed Dec. 8, 1967
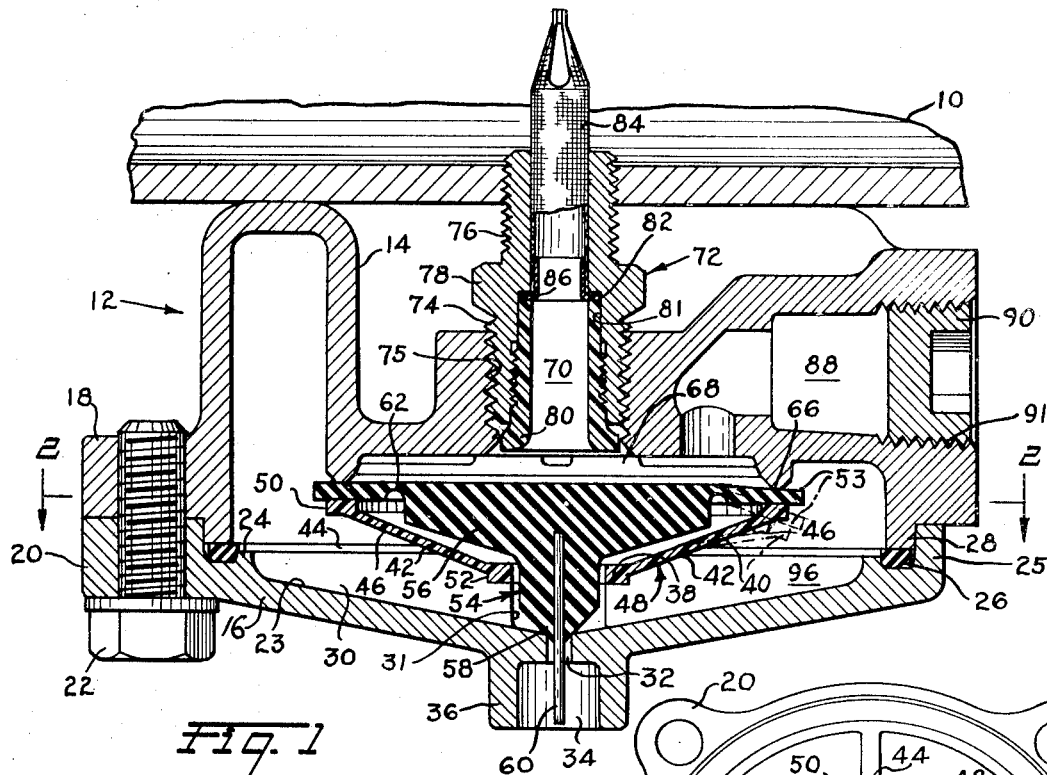
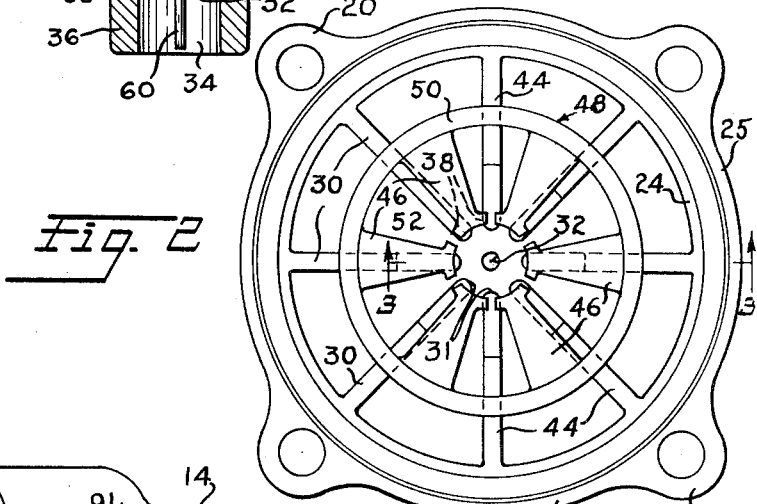
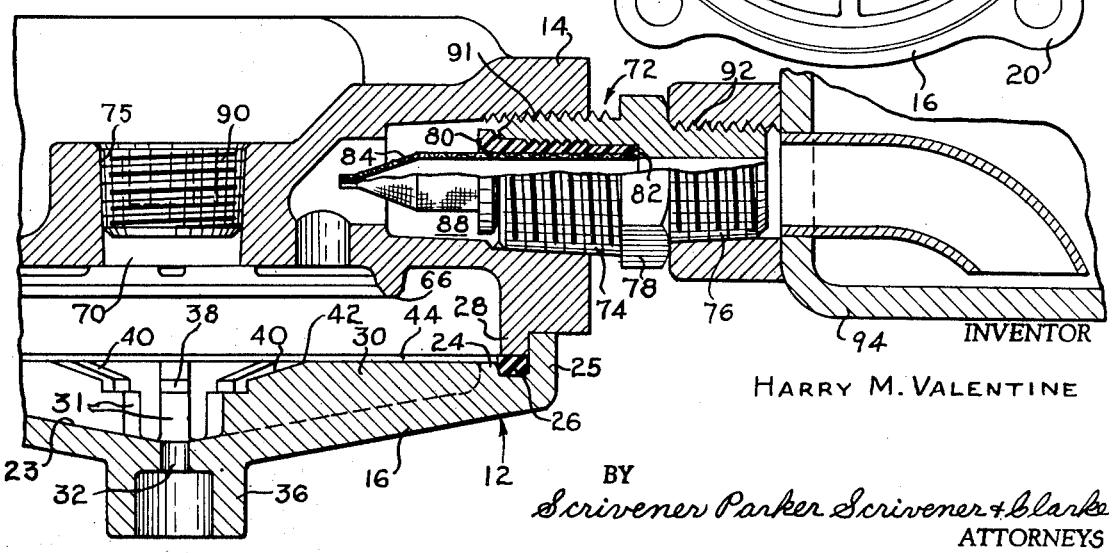
INVENTOR
HARRY M. VALENTINE
BY
Scrivener Parker Scrivener & Clarke
ATTORNEYS

United States Patent Office 3,516,430
Patented June 23, 1970

3,516,430
AUTOMATIC DRAIN VALVE
Harry M. Valentine, Elyria, Ohio, assignor to Bendix-Westinghouse Automotive Air Brake Company, Elyria, Ohio, a corporation of Delaware
Filed Dec. 8, 1967, Ser. No. 689,152
Int. Cl. F16t *1/14*
U.S. Cl. 137—204            6 Claims

ABSTRACT OF THE DISCLOSURE

An automatic drain valve for a fluid pressure reservoir the body thereof being adapted for either bottom or end mounting to the reservoir with a changeable strainer being selectively positioned in the body depending upon the type of mounting; including also an annular supply and exhaust type valve which is operable in response to fluid pressure to drain liquid automatically from the tank, a unique plastic spring having similarity in configuration to a Belleville spring cooperating with the drain valve element, the valve element being also manually operable to effect draining.

---

This invention relates to automatic drain valves for fluid pressure reservoirs and is particularly, though not exclusively, adapted for use in automatically draining condensation from air pressure tanks on vehicles.

The collection of condensate in air pressure reservoirs is well-known and it is essential that the condensate be periodically drained in order to prevent carry-over into the pressure system where the condensate can damage valves and the like, and in the wintertime there is particular danger that condensate may freeze on parts so as to prevent their proper operation. Usually, the means for draining the condensate comprises manual valve means on each tank but draining is often neglected with frequently disastrous results.

Though automatic drain valves have been previously proposed they have been subject to shortcomings, one, for example, being the inability to selectively mount the valve to reservoirs having drain fittings in different positions, as for example in the bottom of the tank or at an end and one of the objects of the present invention is to provide a valve which is capable of such selective mounting including, in addition, an arrangement for adapting a single strainer to the particular valve mounting.

Another object of the invention is to provide in an automatic drain valve of the type mentioned and including an annular diaphragm of flapper valve, improved spring means for controlling the valve.

Other objects and their attendant advantages will become apparent as the following detailed description is read in conjunction with the accompanying drawings wherein:

FIG. 1 is a vertical cross-sectional view of the automatic drain valve of the invention showing the valve connected to the bottom of a fluid pressure reservoir;

FIG. 2 is a horizontal view on a reduced scale, with parts removed for clarity, taken substantially on the line 2—2 of FIG. 1 and particularly illustrating the spring of the invention; and FIG. 3 is a broken vertical cross-sectional view with parts of the valve removed showing alternative means for mounting the valve onto a fluid pressure reservoir.

Referring now to the drawings, and particularly to FIG. 1 the numeral 10 designates a fluid pressure reservoir having connected to the bottom thereof an automatic drain valve 12 constructed in accordance with the present invention. As can be seen, the valve body is composed of an upper part 14 and a lower part 16, the parts having a plurality of mating ears 18, 20 adapted to receive screws 22 for rigidly connecting the parts 14, 16. The lower wall 23 of the body part 16 slopes downwardly toward the center and surrounding the wall 23 is an annular ridge 24 which defines with an outer lip 25 an annular channel receiving an O-ring 26 whose upper surface is sealingly engaged by a depending annular skirt 28 around the periphery of the lower edge of the upper body part 14 of the valve body.

Cast integrally with the upper side of the wall 23 of the lower valve body 16 are a plurality of radial ribs 30, preferably eight in number, having inner ends 31 terminating in circumferentially spaced relationship around a central drain opening 32 which interconnects the interior of the valve body with atmosphere by way of an enlarged passage 34 in the bottom of the valve and defined by an annular wall 36 integral with the lower body part 16.

The inner ends 31 of the ribs 30 are provided with steps 38 whose upper edges fair into upwardly and outwardly sloping faces 40 on the upper sides of the ribs with the sloping portions terminating at points 42 (see FIG. 1 particularly) each of which is closer to the inner ends of the ribs than to the outer ends. Radially outwardly beyond the points 42 the upper side portions 44 of the ribs are horizontal.

With the ribs constructed as described, it will be seen in FIG. 1 that the points 42 provide fulcrum abutments for a series of radially arranged cantilever arms 46 of a valve spring 48 constructed in accordance with the invention. With particular reference to FIGS. 1 and 2, it will be seen that the molded plastic valve spring 48 comprises a continuous upper annular ring 50 from the lower side of which the spring arms 46 extend radially inwardly and downwardly. As can be seen in FIG. 2, there are desirably a lesser number of arms 46 than ribs 30, preferably six of the former and eight of the latter, as shown, with the inner ends of the arms being connected to the upper side of what is essentially a segmented inner ring defining at the inner end of each of the arms a sector shaped foot 52 has a sufficient circumferential dimension to span the circumferential spacing between any two steps. With this arrangement, it will be seen that it is not necessary that each foot 52 be engaged and retained in a predetermined step but rather the entire spring is capable of being disposed in any rotational position with respect to the ribs without any foot 52 becoming disengaged from a step and springing down into the circumferential space between the ends 31 of any two ribs.

With reference to FIG. 1, it can be seen that the upper outer annular ring 50 of the spring engages the underside of an annular flange portion 53 of a unitary valve element 54 which includes a central body part 56 carrying at its lower end a discharge valve 58 for controlling the discharge port 32. The body part 56 of the valve element 54 is provided with a molded-in-place, wire element 60 which extends co-axially through the port 32 and serves to keep the port free of dirt, sludge, etc. while at the same time providing a means whereby the valve 58 may be moved manually off its seat at the upper end of the port 32 to effect manual draining of the reservoir. It will now be apparent that the purpose of the annular wall 36 surrounding the open passage 34 is to protect the extending part of the wire 60 from damage due to flying rocks and the like.

The annular valve flange 53 of the valve element 54 is connected to the central body portion 56 by relatively thin annular web section 62 which permits the annular valve 53 to have a degree of movement which is practically independent of the central portion 56 of the valve element with the spring 48 acting almost exclusively on the annular valve flange 53 to control its engagement with a depending annular valve seat 66 formed on the inner face of the upper portion 14 of the valve body. The seat 66 defines with the valve 54 a pressure chamber 68 which is in constant communication with the reservoir 10 by way of a passage 70 through an adapter 72 having a threaded lower part 74 screwed into a mating opening 75 in the upper body member 14. The adapter has an upper threaded part 76 which is screwed into a mating opening in the bottom of the reservoir and has a central hex portion 78 between the threaded parts 74, 76. The passage 70 at its lower end is counter-bored at 81 and threaded to receive a hollow sleeve retainer 80, which may be of plastic material, and whose inner end engages and clamps an annular flange 82 of a strainer 84 against a shoulder 86 at the upper end of the counterbore. As can be seen, the strainer in FIG. 1 extends upwardly through the passage 70 into the interior of the reservoir.

In addition to the passage 70, the upper portion 14 of the valve body is also provided with a second drain passage 88 leading into the chamber 68 at substantially right angles to the passage 70 but when the valve of the invention is connected to a tank as shown in FIG. 1 the passage 88 is blanked off by a pipe plug 90 in an opening 91 of the same size as the opening 75 and as the lower portion 74 of the adapter 72.

With reference now to FIG. 3, the alternative mounting means for the drain valve is shown and here it will be noted that the pipe plug 90 now closes off the opening 75 on the upper side of the upper portion 14 of the valve body. The adapter 72 is now threaded into side opening 91 but before the adapter is screwed into the position of FIG. 3, the retainer 80 is screwed out of the counter-bore 81 in the adapter and the strainer 84 is reversed in the counter-bore so that its end extends into the passage 88 when the adapter is in the position of FIG. 3. It will be seen in FIG. 3, of course, that the retainer 80 clamps the flange 82 of the strainer to retain the latter in its position of use exactly as it does in the reverse position of the strainer as shown in FIG. 1. As in the case of FIG. 1, the upper end 76 of the adapter 72 is screwed into a threaded opening 92 in the end wall 93 of an air pressure reservoir 94.

In operation, when the valve is connected to the bottom of an air pressure tank 10 as in FIG. 1, condensate which has collected in the bottom of the tank passes through the filter 84 into the chamber 68 on top of the valve element 54. If the pressure within the tank 10 is greater than the pressure in the drain cavity 96 of the valve, which cavity comprises all of that volume in the valve body outwardly of the annular valve seat 66, then the reservoir pressure acting downwardly urges the annular valve portion 53 against the upward spring force of the arms 46 of the spring 48 causing the upper annular ring 50 of the spring and the valve part 53 to flex downwardly about the web 62 substantially to the position indicated by the phantom lines on the right hand side of FIG. 1, it being noted that some of the arms 46 fulcrum about the points 42 of the ribs as previously described. Meanwhile, the pressure in the reservoir also acts downwardly on the central portion 56 of the valve element 54 to urge this downwardly so that the lower valve member 58 positively closes off the drain port 32. When the annular valve 53 is flexed to open position, any condensate in the reservoir 10 flows into the drain cavity 96 and downwardly along the sloping wall 23 between the ribs 30 and around the valve element 58 in the lower portion of the valve body.

After the fluid pressure in the reseroir 10 has been depleted to a certain extent, the higher pressure in the drain cavity 96 operates in conjunction with the spring 48 to move the annular valve member 53 against the annular valve seat 66 thereby disconnecting the drain cavity 96 from the reservoir 10. As the pressure continues to deplete in the reservoir 10 to a predetermined level, the pressure in the drain reservoir 96 acts upwardly on the central portion of the valve element 56 with a force which exceeds the downward force of the reservoir pressure acting on the upper side of the valve body 56 whereupon the valve 58 is lifted clear of its seat surrounding the drain port 32 and any condensate, sludge, etc. in the cavity 96 is expelled rapidly to atmosphere by the sudden release of the pressure fluid in the cavity 96. As can be expected, as soon as the valve element 58 is opened, all of the liquid in the drain cavity 96 is expelled with considerable force and immediately following this action the pressure in the drain cavity 96 drops to a point whereby the pressure acting on the upper side of the body 56 of the valve element 54 returns the valve 58 to its position closing the drain port 32, whereupon the foregoing cycle is repeated.

If for any reason manual draining should be desired, an operator need merely push inwardly on the wire 60 to force the valve 58 off of its seat manually whereupon any liquid trapped in the drain cavity 96 can escape through the drain port. Manual draining may be particularly desirable under no-air conditions where the valve 58 may be held closed by gravity and it is desired to drain any residue that might exist in the cavity 96.

In the event that the valve is to be connected to the end wall of a reseroir, the valve operates in identical fashion as previously explained except that the upper central opening 75 is closed by the pipe plug 90 as previously explained and the strainer is reversed in the adapter as shown in FIG. 3 and the latter is threaded into the tank end wall all as previously explained.

From the foregoing description, it will be apparent that the valve of the invention has provided an automatic drain valve for fluid pressure reservoirs which is capable of being selectively mounted on existing reservoirs irrespective of the positions of their drain openings. Additionally the invention has provided improved cantilever spring means for the drain valve with the spring means being enclosed within the drain cavity to aid in closing the drain valve flange 53 while at the same time providing fail-safe protection that is often absent where the drain valve is biased to closed position by an exterior spring. It will of course be apparent to those skilled in the art that the valve of the invention is susceptible of a variety of changes without, however, departing from the scope and spirit of the appended claims.

What is claimed is:

1. An automatic drain valve of the type including a body having first and second chambers, an annular valve seat between the chambers and a flexible valve member within said second chamber and cooperating with said seat, said valve member opening in response to a higher pressure in said first chamber than in said second chamber to connect said chambers and a higher pressure in the second chamber than in the first to disconnect said chambers, an atmospheric port in said second chamber and a valve element connected to said flexible valve member and movable to open position by said valve member to connect said second chamber to atmosphere when the pressure in said second chamber is at a predetermined higher level than in said first chamber, the invention which comprises first and second drain passages leading into said first chamber, said passages being at substantially right angles to each other and opening outwardly of said valve body, each of said openings being adapted to receive alternatively, a closure member whereby said valve can be selectively connected through the other of said openings to differently positioned drain openings of successive fluid pressure reservoirs, said openings being of the same size and interiorly threaded, said closure member comprising a threaded plug received in one of said openings, an adapter having a threaded part at one end the same size as said plug and received within the other of said openings, and having a second threaded part at the other end thereof and adapted to be received in a threaded drain opening of a fluid pressure reservoir, said adapter having a central passage therethrough, said central passage being counterbored so that a portion of the length thereof is of a larger diameter than the remainder of the passage, a shoulder at the juncture of the counter-bore and said remainder of the passage, a strainer received in said passage and having an outwardly extending flange at one end engaging said shoulder, and a hollow sleeve retainer received in said counter-bore and clamping said strainer flange against said shoulder to position said strainer within said passage.

2. The automatic drain valve of claim 1 wherein said counter-bore, sleeve and strainer are constructed and arranged that the position of said strainer may be reversed in said passage, said sleeve being of the same size interiorly as said passage so as to receive said strainer therein in reverse position in the same manner as said strainer is received directly in said passage in its first position.

3. An automatic drain valve of the type including a body having first and second chambers therein, an annular valve seat between the chambers, drain passage means leading from said first chamber through the valve body and adapted to connect said first chamber to the interior of a fluid pressure reservoir, a drain port leading from the second chamber through the valve body for connecting the second chamber to atmosphere, a valve member within said second chamber comprising a flexible annular valve flange cooperating with said valve seat and a central body portion, a relatively thin annular web section connecting said body portion and said annular valve flange of said valve member, a valve element fixed to said central body portion for controlling said drain port, and spring means within said second chamber and engaging solely said annular valve flange to bias this at all times towards a closed position against said valve seat, said spring means including an upper annular ring engaging the underside of said annular valve flange, and a plurality of circumferentially spaced radial arms having outer ends connected to said ring and extending downwardly and inwardly with respect thereto, and means for supporting the inner end portions of said arms such that the outer end portions are unsupported and constitute cantilever spring arms when said annular valve flange is moved off said valve seat.

4. The automatic drain valve of claim 3 wherein said valve element includes a stem extending co-axially outwardly through said drain port, said stem being manually operable to move said valve element to open position.

5. The automatic drain valve of claim 3 wherein said supporting means includes a segmented ring of less diameter than said upper ring integrally connected to the inner ends of said arms, each of the segments of said last named ring being equally spaced from adjacent segments and extending symmetrically to either side of the center line of the respective arms, each segment defining an arcuate foot on the inner end of an arm, and an annular recess within said second chamber co-axially surrounding said drain port for receiving the feet of said arms.

6. The drain valve of claim 5 including a plurality of radial ribs in said second chamber having circumferentially spaced inner ends surrounding said drain port, said annular recess being defined by steps on the upper inner ends of said ribs in which said feet are received, the circumferential length of each of said feet being greater than the spacing between any two adjacent steps, the upper edges of said ribs sloping upwardly from said steps along a minor portion of their lengths, the remainder of the upper edges of said ribs beyond said sloping portions being horizontal, the point of juncture of said horizontal and sloping portions affording fulcrum for the arms of said spring means when the same are flexed downwardly in response to a higher pressure in said first chamber than in said second acting downwardly on said annular valve flange to move same to open position.

References Cited

UNITED STATES PATENTS

| | | | |
|---|---|---|---|
| 2,232,899 | 2/1941 | Aikman | 137—204 |
| 2,274,127 | 2/1942 | Carroll | 137—549 X |
| 2,591,432 | 4/1952 | Hoerner | 137—544 X |
| 3,116,095 | 12/1963 | Leighton | 137—102 X |
| 3,351,281 | 11/1967 | Keil | 137—192 X |

ALAN COHAN, Primary Examiner